United States Patent
Argyropoulos et al.

(10) Patent No.: US 7,956,154 B2
(45) Date of Patent: Jun. 7, 2011

(54) POLYMERS INCORPORATING 1,3 AND 1,4 CYCLOHEXANEDIMETHANOL

(75) Inventors: John N. Argyropoulos, Midland, MI (US); Marcos Pini Franca, São Paulo (BR); Gary E. Spilman, Midland, MI (US)

(73) Assignee: Dow Global Technologies LLC

( * ) Notice: Subject to any disclaimer, the term of this patent is extended or adjusted under 35 U.S.C. 154(b) by 0 days.

(21) Appl. No.: 11/991,276

(22) PCT Filed: Sep. 26, 2006

(86) PCT No.: PCT/US2006/037262
§ 371 (c)(1),
(2), (4) Date: Apr. 2, 2009

(87) PCT Pub. No.: WO2007/038437
PCT Pub. Date: Apr. 5, 2007

(65) Prior Publication Data
US 2009/0192286 A1  Jul. 30, 2009

Related U.S. Application Data

(60) Provisional application No. 60/720,983, filed on Sep. 27, 2005.

(51) Int. Cl.
*C08G 63/00* (2006.01)
*C08G 63/02* (2006.01)

(52) U.S. Cl. ............... 528/307; 264/176.1; 264/219; 428/411.1; 502/150; 528/176; 528/190; 528/192; 528/193; 528/194; 528/271; 528/272; 528/279; 528/283; 528/285

(58) Field of Classification Search ............ 264/176.1, 264/219; 428/411.1; 502/150; 528/176, 528/190, 192, 193, 194, 271, 272, 279, 283, 528/285, 307
See application file for complete search history.

(56) References Cited

U.S. PATENT DOCUMENTS

| | | | |
|---|---|---|---|
| 4,177,315 A | 12/1979 | Ubersax | |
| 4,348,462 A | 9/1982 | Chung | |
| 4,554,343 A * | 11/1985 | Jackson et al. | 528/274 |
| 4,578,453 A | 3/1986 | Jackson, Jr. et al. | |
| 4,600,768 A | 7/1986 | Jackson, Jr. et al. | |
| 4,775,732 A | 10/1988 | Lapin | |
| 5,017,679 A | 5/1991 | Chang et al. | |
| 5,523,382 A | 6/1996 | Beavers et al. | |
| 5,552,512 A | 9/1996 | Sublett | |
| 5,773,554 A | 6/1998 | Dickerson et al. | |
| 6,252,121 B1 | 6/2001 | Argyropoulos et al. | |
| 6,255,523 B1 | 7/2001 | Panandiker et al. | |
| 6,706,779 B2 | 3/2004 | Bahadur et al. | |
| 7,244,792 B2 | 7/2007 | Agarwal et al. | |
| 7,375,144 B2 | 5/2008 | Gilmer | |
| 7,687,594 B2 | 3/2010 | Hung et al. | |
| 2004/0132924 A1 * | 7/2004 | Weiss et al. | 525/419 |
| 2004/0151838 A1 | 8/2004 | Fenn et al. | |
| 2005/0245711 A1 | 11/2005 | Narayan-Sarathy et al. | |
| 2009/0198014 A1 | 8/2009 | Baikerikar et al. | |
| 2009/0253585 A1 | 10/2009 | Diatchenko et al. | |
| 2009/0253858 A1 * | 10/2009 | Argyropoulos et al. | 524/591 |

FOREIGN PATENT DOCUMENTS

| | | |
|---|---|---|
| CA | 2548040 | 6/2005 |
| WO | 9013587 | 11/1990 |

OTHER PUBLICATIONS

W.F.H. Borman, "Molecular Weight-Viscosity Relationships for Poly(1,4-butylene Terephthalare)", Journal of Applied Polymer Science, vol. 22, 2119-2126, 1978.

John Argyropoulous, et al. "Unoxol TM Diol: a New Liquid Cycloaliphatic Diol for Coatings Applications", Paint & Coatings Industry magazine, Jun. 2006, pp. 1-5.

* cited by examiner

*Primary Examiner* — Terressa M Boykin

(57) ABSTRACT

A polymer containing a polyester polymer unit having the formula -(I-III-II)-, wherein III is derived form a di-carboxylic acid, wherein I is derived from 1,3 cyclohexanedimethanol, wherein II is derived from 1,4 cyclohexanedimethanol and wherein the polymer is a solid at room temperature.

18 Claims, No Drawings

POLYMERS INCORPORATING 1,3 AND 1,4 CYCLOHEXANEDIMETHANOL

CROSS REFERENCE TO RELATED APPLICATIONS

This application is a 371 of PCT/US06/037262 filed Sept. 26, 2006, which claims the benefit of U.S. Provisional Application Ser. No. 60/720,983, filed Sept. 27, 2005.

BACKGROUND OF THE INVENTION

The instant invention relates to polymers comprising polyester polymer units useful in thermosetting powder coating compositions.

Thermosetting powder coating compositions are well known in the art and are widely used as coatings for office furniture, electric appliances, bicycles, garden furniture, accessories for the automotive industry, general metal parts and the like. The general approach associated with powder coating technology is to formulate a coating from solid components, mix them, disperse pigments (and other insoluble components) in a matrix of the major binder components, and pulverize the formulation into a powder. The powder is applied to the substrate, usually but not limited to a metal, and fused to a continuous film by baking.

Polymers comprising polyester polymer units are useful in thermosetting powder coating compositions. Such polymers comprise a polyester polymer unit containing the formula -(I-III-I)-, or alternatively, -(III-I-III)-, wherein III is derived from a dicarboxylic acid such as terephthalic acid, and wherein I is derived from a diol and/or a polyol such as neopentyl glycol. When 1,4-cyclohexanedimethanol is used as a diol component, the resulting thermosetting powder coating compositions comprising such polymers can suffer from drawbacks related to excessive melt viscosity and processability. Excessive melt viscosity of the polymer of a thermosetting powder coating composition requires an excessive bake oven temperature to fuse the polymer thereby degrading the polymer. As a result, the advantages of using 1,4-cyclohexanedimethanol in a powder coating composition can not be fully realized. The processability of the polyester during its formation is hindered by a successively increasing melt transition temperature as molecular weight builds. This is attributed to the highly crystalline nature of 1,4-cyclohexanedimethanol content. This phenomenon causes difficulties in maintaining a homogeneous polymerization, as plate-out can occur at the edges and interface of the mixture.

SUMMARY OF THE INVENTION

The gist of the instant invention is the discovery that polyester polymers derived from a diol composition consisting of a mixture of 1,3-cyclohexanedimethanol and 1,4-cyclohexanedimethanol have low melt viscosities and are easily processable at acceptable glass transition temperatures, for the preparation of powder coatings with a surprising balance of chemical resistance, hardness and flexibility together with excellent appearance.

More specifically, the instant invention is a polymer, characterized by: a polyester polymer unit containing the formula -(I-III-II)-, wherein III is derived from a dicarboxylic acid, wherein I is derived from 1,3-cyclohexanedimethanol, wherein II is derived from 1,4-cyclohexanedimethanol and wherein the polymer is a solid at room temperature. In one embodiment, the invention includes a polymer comprising a polyester polymer unit derived from the reaction of a multifunctional carboxylic acid with 1,3 cyclohexanedimethanol and 1,4 cyclohexanedimethanol, wherein the polymer is a solid at room temperature.

DETAILED DESCRIPTION

Polymers are macromolecules formed by the union of one or more monomers. The resulting macromolecule can comprise a linear, branched or crosslinked backbone. Polymers comprising a polyester unit usually are prepared from the condensation of monomers comprising a diacid and/or a polyacid and a diol and/or a polyol (the terms diacid, polyacid, diol and polyol are well understood in the art and are defined in U.S. Pat. No. 6,255,523, herein fully incorporated by reference). The instant invention is a polymer comprising a polyester polymer unit having the formula -(I-III-II)-, wherein III is derived from a dicarboxylic acid, wherein I is derived from 1,3-cyclohexanedimethanol and wherein II is derived from 1,4-cyclohexanedimethanol. More specifically, the diol of this invention is preferably an isomeric mixture of 1,3-cyclohexanedimethanol and 1,4-cyclohexanedimethanol, which mixture can be made according to the teachings of U.S. Pat. No. 6,252,121 and which mixture is available commercially from The Dow Chemical Company under the trade name UNOXOL Diol. Advantageously, the diol mixture will contain from about 5 to about 95 weight percent of 1,3-cyclohexanedimethanol and from about 95 to about 5 weight percent of 1,4-cyclohexanedimethanol, preferably from about 20 to 80 weight percent 1,3-cyclohexanedimethanol and from about 80 to about 20 weight percent 1,4-cyclohexanedimethanol, and more preferably the diol mixture will consist of 45 to 60 weight percent 1,3-cyclohexanedimethanol and 40 to 55 weight percent 1,4-cyclohexanedimethanol. The polymer of the instant invention must be a solid at room temperature. More preferably, the glass transition temperature of the polymer of the instant invention is greater than 30° C. Even more preferably, the glass transition temperature of the polymer of the instant invention is greater than 40° C. A highly preferred diacid is terephthalic acid. Examples of other diacids that can be used include, without limitation: phthalic acid, isophthalic acid, adipic acid, azelaic acid, sebacic acid, cyclohexane dicarboxylic acid, trimellitic acid, fumaric acid, naphthalene dicarboxylic acid, 5-tert-butyl isophthalic acid (5-TBIA), 1,1,3-trimethyl-3-phenylindan-4',5'-dicarboxylic acid (PIDA) and trimesic acid. It should be understood that the term "derived from a dicarboxylic acid" is defined herein as including being derived from an anhydride of a dicarboxylic acid. Terephthalic acid, isophthalic acid and many other diacids are available commercially.

The polymer of the instant invention can also contain groups other than -(I-III-II)- (such as -(I-III-I)- or -(II-III-II)-). Typically, such groups will be polyester groups derived from a diacid (or a polyacid) and a diol (or polyol) other than 1,3-cyclohexanedimethanol and 1,4-cyclohexanedimethanol. Examples include, without limitation thereto, ethylene glycol, propylene glycol, 1,3-propanediol, 1,3-butanediol, 1,6-hexanediol, neopentyl glycol, 1,4-butylene glycol, 1,5-pentanediol, methyl propanediol, cyclohexane dimethanol, hydrogenated bisphenol A, ethylene oxide adducts of bisphenol A, propylene oxide adducts of bisphenol A, ethylene oxide adducts of bisphenol F, propylene oxide adducts of bisphenol F, ethylene oxide adducts of bisphenol S, ethylene oxide adducts of bisphenol S, 2-methyl-1,3-propanediol, and tris(hydroxyethyl)isocyanurate as well as multifunctional glycols such as erythritol, pentaerythritol, dipentaerythritol, glycerol, trimethylolethane, trimethololpropane, dulcitol, threitol, diethylene glycol, triethylene glycol, dipropylene glycol and trimethylpentanediol. It should be understood that the polymer of the instant invention can be terminated with an alcohol such as 2-ethylhexanol or benzyl alcohol or with an acid such as benzoic acid. The polymer of the instant invention will typically otherwise terminate with polyester units derived from polyacids or polyols to provide a means for cross-linking the polymer of the thermosetting powder coating composition during the bake cycle of the powder coating process.

The weight average molecular weight of the polymer of the instant invention preferably is in the range from 300 to 10,000 grams per mole as determined by gel permeation chromatography. The weight percent of the -(I-III-II)- groups is preferably more than one percent of the weight of the polymer as determined by NMR spectroscopy. The weight percent of the -(I-III-II)- groups is more preferably more than ten percent of the weight of the polymer as determined by NMR spectroscopy. The weight percent of the (I-III-II)- groups is even more preferably more than twenty percent of the weight of the polymer as determined by NMR spectroscopy. The weight percent of the -(I-III-II)- groups is yet even more preferably more than thirty percent of the weight of the polymer as determined by NMR spectroscopy. The polymer of the instant invention typically consists essentially of polyester units which terminate with hydroxyl groups or with carboxyl groups. The polymers of the instant invention are useful in powder coating formulations typically made by blending the polymer with the other ingredients of the formulation followed by pulverization to a powder. The impact resistance of a coating made from a powder coating formulation of the instant invention is preferably greater than 13.6 m.N (120 inch-pounds) as determined by ASTM test D2794.

EXAMPLE 1

POLYMER 1

8.31 moles of UNOXOL brand diol, which is an isomeric mixture of 1,3 cyclohexanedimethanol and 1,4 cyclohexanedimethanol available from The Dow Chemical Company, 0.44 moles of trimethylolpropane, 8.27 moles of terephthalic acid and 2 grams of butylstannoic acid (a catalyst for the polymerization reaction) are mixed in a 3 liter reactor equipped with a mechanical stirrer, insulated heated packed column, distillation condenser, thermocouples, and nitrogen stream, set up for a high-temperature melt reaction. The reactants, catalyst, and diol are charged to the reactor and the reactor is purged with nitrogen. The reactor is heated gradually and the contents are stirred as soon as possible. A nitrogen atmosphere is maintained and the melt is stirred @ 300 rpm. An excess of 1%-2% of any diol and/or glycol employed is added with the initial reactant charge indicated.

The mixture is heated from room temperature to 180° C. over 1.3 hours, then to 235° C. over 6 hours and then held at 230-235° C. for a time sufficient to obtain a polymer with an acid number of from 5 to 10 mg KOH/g. Water generated as a result of the polymerization reaction is removed by a flow of nitrogen under positive pressure through the reactor headspace. However, to obtain the desired acid number, the final stage can be performed under a slight vacuum. Water is removed from the reaction through the insulated heated packed column and distillation condenser. The resulting polymer is designated polymer 1. The cone and plate melt viscosity of polymer 1 is 28.8 Pa·s (28,800 cps) at 150° C. as determined by ASTM test D4287.

COMPARATIVE EXAMPLE 1

POLYMER 2

The process of Example 1 is repeated, except that 8.31 moles of neopentyl glycol, 0.44 moles of trimethylolpropane, 8.27 moles of terephthalic acid and 2 grams of butylstannoic acid are used as the reaction mixture. The resulting polymer is designated polymer 2. The cone and plate melt viscosity of polymer 2 is 154 Pa·s (154,000 cps) at 150° C. as determined by ASTM test D4287.

COMPARATIVE EXAMPLE 2

POLYMER 3

The process of Example 1 is repeated, except that 8.31 moles of 1,4-cyclohexanedimethanol, 0.44 gram moles of trimethylolpropane, 8.27 moles of terephthalic acid and 2 grams of butylstannoic acid are used as the reaction mixture. The resulting polymer is designated polymer 3. The cone and plate melt viscosity of polymer 3 at 150° C. is too high to measure.

EXAMPLE 2

POLYMER 4

The process of Example 1 is repeated, except that 4.15 moles of neopentyl glycol, 4.15 moles of an isomeric mixture of 1,3-cyclohexanedimethanol and 1,4-cyclohexanedimethanol, 0.44 moles of trimethylolpropane, 8.27 moles of terephthalic acid and 2 grams of butylstannoic acid are used as the reaction mixture. The resulting polymer is designated polymer 4. The cone and plate melt viscosity of polymer 4 is 5.9 Pa·s (59,400 cps) at 150° C. as determined by ASTM test D4287.

COMPARATIVE EXAMPLE 3

POLYMER 5

The process of Example 1 is repeated, except that 4.15 moles of neopentyl glycol, 4.15 moles of 1,4-cyclohexanedimethanol, 0.44 gram moles of trimethylolpropane, 8.27 moles of terephthalic acid and 2 grams of butylstannoic acid are used as the reaction mixture. The resulting polymer is designated polymer 5. The cone and plate melt viscosity of polymer at 150° C. is too high to measure.

COMPARATIVE EXAMPLE 4

POLYMER 6

A commercially available polyester polyol for powder coating (Uralac 6504 brand powder coating resin, DSM, Augusta, Ga.) is designated polymer 6.

EXAMPLE 3

POLYMER 7

The process of Example 1 is repeated, except as noted. The polyester polyols of this Example are based on trimethylolpropane (TMP), isophthalic acid (IPA) and UNOXOL Diol as detailed in the following table.

| Reactants | Grams |
| --- | --- |
| UNOXOL Diol | 854.0 |
| Trimethylolpropane | 24.1 |
| Isophthalic acid | 909.2 |
| catalyst - monobutyltin oxide | 2.0 |
| catalyst - triphenylphosphite | 0.8 |
| isophthalic acid - 2$^{nd}$ stage addition | 168.0 |

The temperature profile used is:
25° C.-180° C. over 1.5 hours
180° C.-235° C. over 4 hours
235° C. hold for final acid value The resin is cooked to a first stage acid number of 5-10 (mg KOH/g sample); then reduced to 180° C. and charged with second stage addition of IPA before ramping up to a final temperature of 230-240° C. and held for a final acid value of 34-40 mg KOH/g. The resulting polymer is designated polymer 7. The cone and plate melt viscosity of polymer 7 is 235 Pa·s at 150° C. as determined by ASTM test D4287.

Melt Viscosity

The cone and plate melt viscosities of the polymers of Example 1 and 2 are surprisingly much lower than the cone and plate melt viscosities of the polymers of comparative examples 1, 2 and 3. The low melt viscosities of the polymers of Example 1 and 2 allows them to be more easily processed into powder coating formulations.

Powder Coating Formulations 400 grams of each of polymers 1, 2, 4 and 5 are mixed with 100 grams of Vestagon B 1530 brand crosslinking agent (Degussa Corporation, Parsippany, N.J.), 4 grams of Fascat 4100 brand catalyst (Arkema Corporation, Philadelphia Pa.), 200 grams of TiPure 706 brand titanium dioxide pigment (E.I. DuPont de Numours, Wilmington, Del.), 6 grams of Modaflow Powder III brand powder flow improver (Surface Specialties SA/NV, Drogenbas, Belgium), 2 grams of benzoin as a pin hole reducer; then melted and extruded; and then ground to an average particle size of 43 micrometers to produce powder coating formulations 1, 2, 4 and 5 respectively. Polymer 3 can not be processed due to its excessively high melt viscosity. 400 grams of polymer 6 is mixed with 100 grams of Vestagon B 1400 brand crosslinking agent, 4 grams of Fascat 4100, 200 grams of TiPure 706, 6 grams of Modaflow Powder III, 2 grams of benzoin; then melt mixed in a twin screw extruder, cooled in a two roll chiller, flaked and then ground to an average particle size of 43 micrometers to produce powder coating formulation 6.

Powder coating formulation 7 is prepared as follows. 94.6 grams of polymer 7, 5.37 grams of hydroxyl alkyl amide (Primid XL 552), 50 grams of titanium dioxide, 2 grams of flow control agent and 0.75 grams of benzoin are formulated into a powder coating formulation. A PRIZM 40 mixer stirring at 2300 rpm is utilized for pre-mixing the formulation ingredients into a homogeneous dry blend. Mixing time is slightly less than one minute. The resulting blend is fed into a PRIZM 24 mm twin-screw extruder, rotating at 400 rpm. The temperature zones are set to 35° C. at the feed; the middle zone at 70° C.; and the head temperature at 90° C. Extruded material is collected on a flat rolled sheet, and is ground using a 9500 rpm rotator speed and 3500 rpm separator speed. The feed zone is set at 10 rpm. The entire process yields an average particle size of 43 micrometer diameter.

Powder coating formulations 1, 2, 4, 5, 6 and 7 are used to coat steel test samples with coatings 1, 2, 3, 4, 5 and 6 respectively with test results shown in the following table.

| | | Coating | | | | | |
| --- | --- | --- | --- | --- | --- | --- | --- |
| Test Parameter | Method | 1 | 2 | 3 | 4 | 5 | 6 |
| Gel Time, s | PCI #6 @ 204° C. | 95.4 | 95.9 | 91.0 | 105 | 79.5 | 63.9 |
| Gloss @ 20° | ASTM D523 | 50.5 | 56.9 | 67.8 | 42.6 | 57.6 | 8.43 |
| Gloss @ 60° | ASTM D523 | 85.7 | 88.1 | 90.0 | 78.5 | 87.2 | 43.6 |
| Adhesion, % | ASTM D3359 | 100 | 100 | 100 | 100 | 100 | 100 |
| Thickness, mm | Microscopy | 0.048 | 0.047 | 0.049 | 0.049 | 0.051 | 0.065 |
| Flexibility, mm[1] | ASTM D522 | 0 | 0 | 0 | 8 | 0 | 0 |
| Impact, m · N | ASTM D2794 | 18.1 | 6.8 | 9.0 | 12.8 | 6.0 | — |
| Appearance | PCI Visual | 9 | 8 | 8 | 8 | 4 | — |
| Chem. Resistance | PCI #8 MEK[2] | >200 | >200[3] | >200[3] | >200 | >200 | 115 |
| Hardness, pencil | ASTM D3363 | 2H | H | H | 2H | H | 4H |
| Glass Trans., ° C.[4] | Calorimetry[5] | 60.5 | 60.2 | 64.9 | 61.4 | 62.7 | — |
| Glass Trans., ° C.[6] | Calorimetry[5] | 83.3 | 79.9 | 82.5 | 82.2 | 76.3 | — |
| Onset of Cure, ° C. | Calorimetry[5] | 169 | 170 | 176 | 181 | 169 | — |
| Exotherm Max., ° C. | Calorimetry[5] | 202 | 201 | 200 | 203 | 202 | — |
| Heat of React., J/g | Calorimetry[5] | 7.24 | 6.97 | 3.64 | 5.60 | 5.48 | — |

[1]Conical Mandrel, mm of disbondment
[2]Number of double rubs
[3]Marring observed
[4]Glass Transition Temperature of the polymer
[5]Differential Scanning Calorimetry
[6]Glass Transition Temperature of the powder coating formulation The test results in the table above show improved direct impact resistance observed for coating 1 made using a polymer of the instant invention compared to coatings 2, 4 and 5 made using a polymer of the prior art. The test results in the table above show that coating 1 made using a polymer of the instant invention provided the best overall balance of hardness and flexibility compared to coatings 2, 4 and 5 made using a polymer of the prior art. The test results in the table above show that coating 1 made using a polymer of the instant invention provided the best overall appearance compared to coatings 2, 4 and 5 made using a polymer of the prior art. The test results in the table above show that coating 3 made using a polymer of the instant invention provided the best gloss compared to coatings 2, 4 and 5 made using a polymer of the prior art. The test results in the table above show that coating 3 made using a polymer of the instant invention provided better flexibility (as measured by the combination of direct impact resistance and conical mandrel bend testing) than coatings 2, 4 and 5 made using a polymer of the prior art. Coating 6 made using a polymer of the instant invention passes the conical mandrel flexibility test, while demonstrating exceptional pencil hardness and excellent chemical resistance, a combination of properties that is difficult to achieve.

CONCLUSION

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains and which fall within the limits of the following claims.

What is claimed is:

1. A polymer, characterized by: a polyester polymer unit having the formula -(I-III-II)-, wherein III is derived from a dicarboxylic acid, wherein I is derived from 1,3-cyclohexanedimethanol, wherein II is derived from 1,4-cyclohexanedimethanol, wherein the polymer is a solid at room temperature, wherein the weight average molecular weight of the polymer is from about 300 to about 10,000 grams per mole as determined by gel permeation chromatography, and wherein the amounts of each of I and II are from about 20 to about 80 weight percent based on the total weight of I and II as determined by NMR spectroscopy.

2. The polymer of claim 1, wherein the amount of I is from about 45 to about 60 weight percent and the amount of II is from about 55 to about 40 weight percent based on the total weight of I and II.

3. The polymer of claim 1, wherein the weight percent of the -(I-III-II)- units is more than one percent of the weight of the polymer.

4. The polymer of claim 1, wherein the weight percent of the -(I-III-II)- units is more than thirty percent of the weight of the polymer.

5. The polymer of claim 1, wherein the polymer chain terminates with hydroxyl groups.

6. The polymer of claim 1, wherein the polymer chain terminates with carboxyl groups.

7. The polymer of claim 5, wherein III is derived from isophthalic or terephthalic acid.

8. A powder coating formulation comprising the polymer of claim 1.

9. A coating comprising the polymer of claim 1.

10. The coating of claim 9, wherein the impact resistance of the coating is greater than 13.6 N.m (120 inch-pounds) according to ASTM test D2794.

11. A polymer comprising a polyester polymer unit derived from the reaction of a multifunctional carboxylic acid with 1,3-cyclohexanedimethanol and 1,4-cyclohexanedimethanol, wherein the polymer is a solid at room temperature, and wherein the weight average molecular weight of the polymer is from about 300 to about 10,000 grams per mole as determined by gel permeation chromatography.

12. The polymer of claim 6, wherein III is derived from isophthalic or terephthalic acid.

13. A polyester comprising a unit having the formula -(I-III-II)-, wherein III is derived from a dicarboxylic acid, wherein I is derived from 1,3-cyclohexanedimethanol, wherein II is derived from 1,4-cyclohexanedimethanol, wherein the polymer is a solid at room temperature, wherein the weight average molecular weight of the polymer is from about 300 to about 10,000 grams per mole as determined by gel permeation chromatography, and wherein the amounts of each of I and II are from about 20 to about 80 weight percent based on the total weight of I and II as determined by NMR spectroscopy.

14. The polyester of claim 13 wherein, in addition to the unit having the formula -(I-III-II)-, the polyester comprises at least one additional unit, the additional unit comprising a polymerized residual diol monomer other than a cyclohexanedimethanol.

15. The polyester of claim 14 wherein the additional unit is based on ethylene glycol, propylene glycol, 1,3-butanediol, 1,3-butanediol, 1,6-hexanediol, or neopentyl glycol.

16. A coating comprising the polymer of claim 13.

17. A powder coating comprising the polymer of claim 13.

18. The coating of claim 16, wherein the impact resistance of the coating is greater than 13.6 N.m (120 inch-pounds) according to ASTM test D2794.

* * * * *